(No Model.)

E. LYON.
PNEUMATIC TIRE.

No. 574,438.  Patented Jan. 5, 1897.

Attest:
A. N. Jesbera
F. M. Eggleston

Inventor:
Edward Lyon
by Redding & Kiddle
Attys.

UNITED STATES PATENT OFFICE.

EDWARD LYON, OF NEW ROCHELLE, NEW YORK.

PNEUMATIC TIRE.

SPECIFICATION forming part of Letters Patent No. 574,438, dated January 5, 1897.

Application filed November 25, 1895. Serial No. 569,991. (No model.)

*To all whom it may concern:*

Be it known that I, EDWARD LYON, a citizen of the United States, and a resident of New Rochelle, in the county of Westchester, State of New York, have invented certain new and useful Improvements in Pneumatic Tires, of which the following is a specification, reference being had to the accompanying drawings, forming a part hereof.

As ordinarily constructed pneumatic tires for vehicles of various descriptions are composed of one or more layers or plies of rubber and one or more layers or plies of a material, such as a heavy cotton fabric, which is comparatively inextensible, although sufficiently flexible to adapt it to the requirements of its use and to some extent resists puncture. Nevertheless, as is well known, pneumatic tires so constructed are easily punctured. Various attempts have been made, it is true, to employ in the manufacture of the tires some material which would resist puncture much more than the cotton fabric usually employed, and for this purpose it has been proposed to use thin sheets of metal, or sheets of celluloid, or sheets of leather, or sheets of rawhide, or other puncture-resisting material in sheets. Tires so constructed do undoubtedly resist puncture; but they are practically useless for the purpose intended, because any material which is sufficiently hard to resist puncture will, if employed in a continuous sheet, be lacking in the qualities of flexibility and resilience and in the capacity to adapt itself to different forms in the degrees required for a practically successful and commercially available pneumatic tire. Having in mind the defects of the tires hitherto devised, I have sought to devise a structure which shall combine the desirable qualities possessed by a practically impenetrable material with the other desirable qualities possessed by the textile fabric hitherto commonly employed; and the invention therefore consists in the matters hereinafter described, and referred to in the appended claims.

The preferred mode of practicing the invention and other features of the invention will be fully described and set forth hereinafter with reference to the accompanying drawings, in which—

Figure 1:
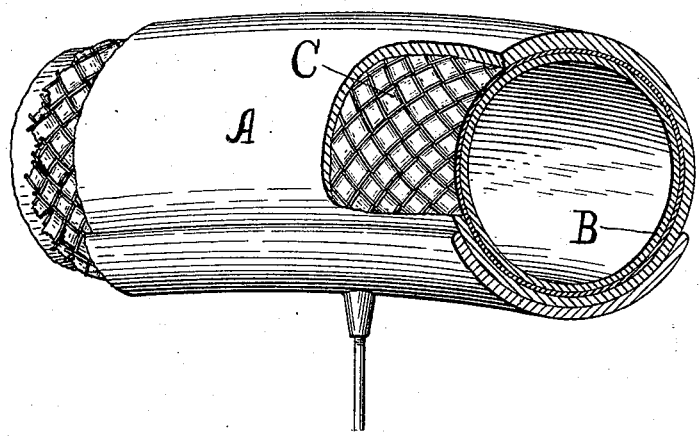
Figure 2:
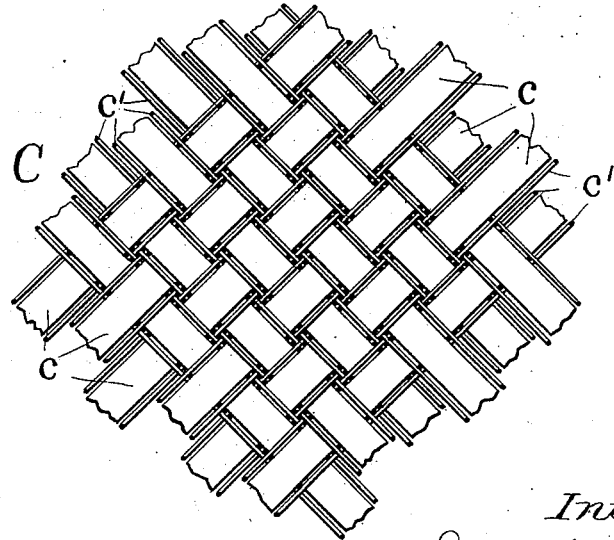

Figure 1 is a view in perspective of a portion of a pneumatic tire which embodies my invention, a portion of the outer covering or layer being removed to show the preferred construction more clearly and a portion of the wheel to which the tire is applied being also shown. Fig. 2 is a detail view, somewhat exaggerated, showing clearly the preferred manner of forming the protective fabric.

I prefer to construct the improved tire with an outer layer of rubber A and an inner layer of rubber B, between which is interposed the novel protective and puncture-resisting layer of fabric C, the outer and inner layers A and B being preferably vulcanized together after the completion of the tube and thereby more closely united with the intermediate layer and to some extent with each other. It will be obvious, however, as this description proceeds that the nature of the fabric C is independent of the particular locality or relative position in which it is used and that it might be made the external covering of the tire, or that the ordinary independent inner air-tube might be employed, or that the parts may be arranged in any desired manner or relation.

As indicated above, the protective layer of fabric C is made up of narrow strips c of rawhide from which the natural oils have been largely extracted, as by passing the strips between heavy rollers, and the strips are then interwoven, preferably in the simple manner represented in Fig. 2. Thereafter the fabric so formed is preferably passed between heavy rollers, so that the strips shall be more or less embedded in one another where they cross and so that the fabric shall be as thin as possible, this pressing under heavy rollers bringing the strips so closely together that the interstices will be so small as not to admit such articles as might penetrate through the rubber.

The fabric is preferably made or formed as a tube to completely inclose the rubber tube within it, and the strips should be so woven together that they shall be disposed obliquely with respect to the axis of the tube, as clearly represented in Fig. 1, this arrangement being necessary to secure for the tire the requisite flexibility. It is obvious, however, that the protective fabric performs its chief function at or near the tread of the tire, and that therefore it need not be formed as a tube, but may be applied as a strip between or held in position by other parts of the tire.

Under some conditions it may be desirable to give to the tire a greater degree of resilience than that which is imparted by the rawhide fabric, and in such cases I introduce into the fabric, preferably with each strip of rawhide, one or more strands $c'$ of a suitably-tempered wire, a properly-tempered wire of aluminium being the most desirable for the purpose. It will be understood that the strips $c$, whether with or without the wires $c'$, are brought together as closely as possible, so that the interstices may not be large enough to admit such articles as might penetrate through the rubber.

It will be obvious that while the protective layer C will resist puncture practically to the same degree as a continuous sheet of rawhide, nevertheless, by reason of its formation of narrow strips which are independent one of the other and are disposed obliquely with respect to the axis of the tire, it will yield readily to conform to the inequalities of the surface over which the wheel may pass, and also to permit the tire to be inflated to the proper tension.

I claim as my invention—

1. A pneumatic tire having a protective layer composed of a fabric woven of strips of rawhide and strands of wire; substantially as described.

2. In a pneumatic tire, the combination of an inner air-tube of rubber and an inclosing protective tube composed of strips of rawhide and strands of wire woven together and disposed obliquely with respect to the axis of the tire; substantially as described.

3. A pneumatic tire having a protective layer composed of a fabric woven of strips of rawhide, said strips being disposed obliquely with respect to the axis of the tire, and being more or less embedded in one another where they cross, and being compressed to close the interstices between the strips; substantially as described.

4. A pneumatic tire having a protective layer composed of a fabric woven of strips of rawhide and strands of wire, the strips of rawhide being embedded more or less within each other where they cross, and the strands of wire being embedded within the rawhide; substantially as described.

This specification signed and witnessed this 13th day of November, A. D. 1895.

EDWARD LYON.

In presence of—
DAVID L. BUCKMAN,
GEORGE H. STETSON.